United States Patent
Okuyama

(10) Patent No.: US 8,836,206 B2
(45) Date of Patent: Sep. 16, 2014

(54) PLASMA DISPLAY PANEL AND PHOSPHOR

(71) Applicant: Panasonic Corporation, Kadoma (JP)

(72) Inventor: Kojiro Okuyama, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/109,277

(22) Filed: Dec. 17, 2013

(65) Prior Publication Data

US 2014/0103795 A1  Apr. 17, 2014

Related U.S. Application Data

(63) Continuation of application No. PCT/JP2012/005658, filed on Sep. 6, 2012.

(30) Foreign Application Priority Data

Sep. 8, 2011  (JP) ................. 2011-195824

(51) Int. Cl.
| | |
|---|---|
| H01J 1/62 | (2006.01) |
| C09K 11/77 | (2006.01) |
| C09K 11/61 | (2006.01) |
| H01J 11/42 | (2012.01) |
| H01J 17/49 | (2012.01) |

(52) U.S. Cl.
CPC .......... *H01J 17/497* (2013.01); *C09K 11/7734* (2013.01); *H01J 2211/12* (2013.01); *C09K 11/61* (2013.01); *H01J 11/42* (2013.01)
USPC ............ 313/486; 313/503; 252/301.4 R

(58) Field of Classification Search
USPC ................ 313/486, 503; 252/301.4 R
See application file for complete search history.

(56) References Cited

U.S. PATENT DOCUMENTS

| | | | |
|---|---|---|---|
| 2004/0155226 | A1 | 8/2004 | Choi |
| 2006/0152135 | A1 | 7/2006 | Choi et al. |
| 2009/0058254 | A1 | 3/2009 | Okuyama et al. |
| 2009/0058255 | A1 | 3/2009 | Oaku et al. |
| 2009/0184333 | A1* | 7/2009 | Wang et al. ............ 257/88 |
| 2009/0218926 | A1 | 9/2009 | Shiraishi et al. |

FOREIGN PATENT DOCUMENTS

| | | |
|---|---|---|
| JP | 2004-244634 | 9/2004 |
| JP | 2006-193712 | 7/2006 |
| JP | 2007-231165 | 9/2007 |
| JP | 2008-034302 | 2/2008 |
| JP | 2008-285576 | 11/2008 |
| JP | 2009-059608 | 3/2009 |
| JP | 2009-259459 | 11/2009 |
| WO | 2006/112404 | 10/2006 |
| WO | 2007/135926 | 11/2007 |

* cited by examiner

*Primary Examiner* — Mary Ellen Bowman
(74) *Attorney, Agent, or Firm* — Hamre, Schumann, Mueller & Larson P.C.

(57) ABSTRACT

A plasma display panel having a short decay time, high luminance, and high efficiency is provided. The plasma display panel includes a green phosphor layer that emits visible light when excited with vacuum ultraviolet rays. The green phosphor layer contains a green phosphor represented by the general formula $aBaO \cdot (2-a)EuO \cdot bMgO \cdot cSiO_2 \cdot fCaCl_2$ (where $1.800 \leq a \leq 1.980$, $0.950 \leq b \leq 1.050$, $1.900 \leq c \leq 2.100$, and $0.001 \leq f \leq 0.020$).

3 Claims, 1 Drawing Sheet

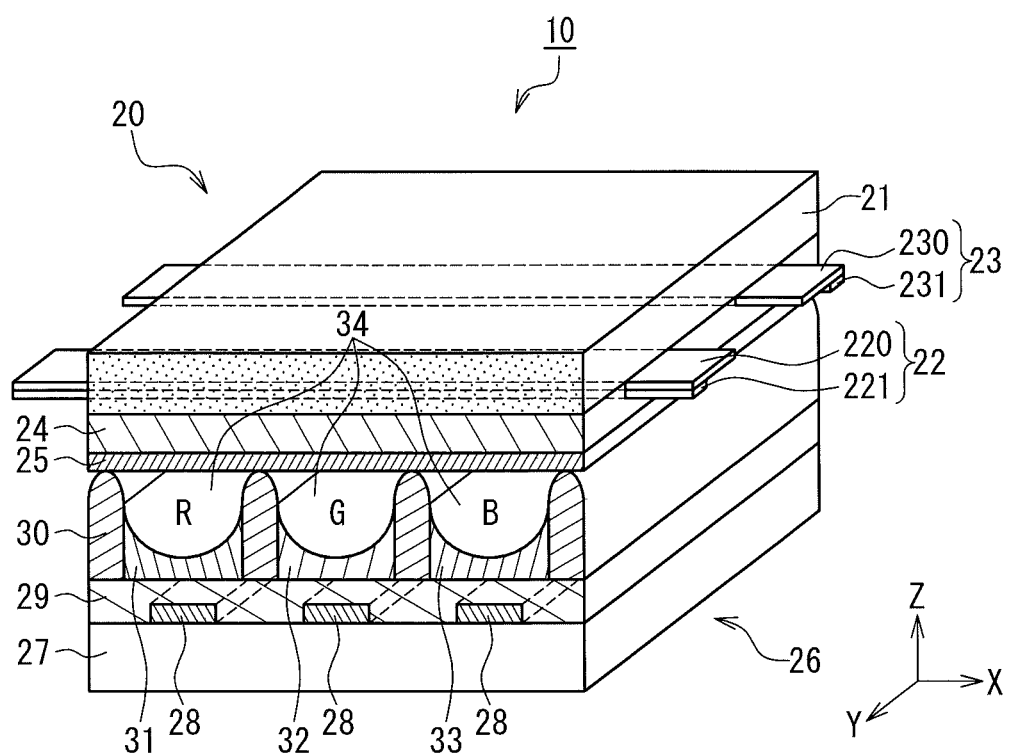

PLASMA DISPLAY PANEL AND PHOSPHOR

TECHNICAL FIELD

The present disclosure relates to a plasma display panel (hereinafter also referred to as a "PDP" as appropriate) and a phosphor used in plasma display panels, mercury-free fluorescent lamps, and the like.

BACKGROUND ART

In recent years, various compositions have been put into practical use as PDP phosphors. For example, $BaMgAl_{10}O_{17}$:Eu is used as a blue phosphor, and a mixture of $(Y, Gd)Al_3B_4O_{12}$:Tb and $Zn_2SiO_4$:Mn is used as a green phosphor.

However, when a mixture of $(Y, Gd)Al_3B_4O_{12}$:Tb and $Zn_2SiO_4$:Mn or $Zn_2SiO_4$:Mn is used as a green phosphor, the decay time becomes long. Therefore, when a rapidly moving video is displayed, so-called "tailing" occurs, which degrades the moving image display characteristics in a PDP. Further, particularly in a 3D-PDP capable of expressing a stereoscopic video, when the decay time of a phosphor to be used becomes long, there arises a problem in that a satisfactory stereoscopic image cannot be displayed due to moving image crosstalk in which a left eye image and a right eye image switched to be displayed in a short period of time overlap each other. Therefore, in a PDP application, there is a strong demand for a green phosphor whose decay time is short.

Thus, as a green phosphor, a technique of using $Y_3Al_5O_{12}$:Ce whose decay time is remarkably short (see Patent Document 1, for example) and a technique of using $(Ca, Sr)_2MgSi_2O_7$:Eu (see Patent Document 2, for example) have been proposed.

PRIOR ART DOCUMENTS

Patent Documents

Patent Document 1: JP 2006-193712 A
Patent Document 2: JP 2009-59608 A

DISCLOSURE OF INVENTION

Problem to be Solved by the Invention

Although the decay time of green phosphors can be reduced by the above conventional techniques, the luminance declines relative to using a mixture of $(Y, Gd)Al_3B_4O_{12}$:Tb and $Zn_2SiO_4$:Mn or $Zn_2SiO_4$:Mn.

The present disclosure solves the above-mentioned conventional problems, and an object of the present disclosure is to provide a PDP capable of displaying images having short decay time, high efficiency, and high luminance, and a phosphor suited for use in light-emitting devices including PDPs.

Means for Solving Problem

The PDP according to the present disclosure is a plasma display panel including a green phosphor layer that emits visible light when excited with vacuum ultraviolet rays. The green phosphor layer contains a phosphor represented by the general formula $aBaO.(2-a)EuO.bMgO.cSiO_2.fCaCl_2$ (where $1.800 \leq a \leq 1.980$, $0.950 \leq b \leq 1.050$, $1.900 \leq c \leq 2.100$, and $0.001 \leq f \leq 0.020$).

In the above general formula, a is preferably in the range of $1.880 \leq a \leq 1.960$.

Further, the phosphor according to the present disclosure is represented by the general formula $aBaO.(2-a)EuO.bMgO.cSiO_2.fCaCl_2$ (where $1.800 \leq a \leq 1.980$, $0.950 \leq b \leq 1.050$, $1.900 \leq c \leq 2.100$, and $0.001 \leq f \leq 0.020$).

Effects of the Invention

The PDP according to the present disclosure is capable of displaying images having a short decay time, high efficiency, and high luminance. Further, the present disclosure is useful in obtaining a phosphor suited for use in light-emitting devices including such a PDP.

BRIEF DESCRIPTION OF DRAWINGS

FIG. 1 is a schematic cross-sectional view showing the configuration of a PDP according to one embodiment.

DESCRIPTION OF THE INVENTION

Hereinafter, embodiments of the PDP according to the present disclosure and the phosphor used in the PDP will be described in detail.

<Composition of Phosphor>

The phosphor according to the present disclosure is represented by the general formula $aBaO.(2-a)EuO.bMgO.cSiO_2.fCaCl_2$ (where $1.800 \leq a \leq 1.980$, $0.950 \leq b \leq 1.050$, $1.900 \leq c \leq 2.100$, and $0.001 \leq f \leq 0.020$). In terms of the luminance, a is preferably in the range of $1.880 \leq a \leq 1.960$.

<Production Method of Phosphor>

Hereinafter, a method for producing the phosphor according to the present embodiment will be described. It should be noted that the production method of the phosphor according to the present disclosure is not limited to the following.

As materials, compounds that become oxides by sintering, such as hydroxides, carbonates, and nitrates of high purity (purity: 99% or more), or oxides of high purity (purity: 99% or more) can be used.

The phosphor is produced by mixing the above-mentioned materials, followed by sintering, and as a method for mixing the materials, wet mixing in a solution or dry mixing of dry powder may be used. For mixing, mixing devices typically used for industrial purposes such as a ball mill, a medium agitation mill, a planetary mill, a vibrating mill, a jet mill, a V-type mixer, an agitator and the like can be used.

First, the mixed powder is sintered in air at a temperature in the range of 700 to 1100° C. for 1 to 10 hours. Then, the mixed powder is further sintered in a low oxygen partial pressure atmosphere containing 0 to 10 vol % of hydrogen, such as in nitrogen gas atmosphere, at a temperature in the range of 1000 to 1300° C. for 1 to 10 hours.

As a furnace used for sintering, a furnace that is typically used for industrial purposes can be used, and a continuous electric furnace such as a pusher furnace or a batch-type electric furnace or gas furnace can be used.

The phosphor powder obtained as a result of sintering is crushed again with a ball mill or a jet mill, and washed or classified, if required, whereby the particle size distribution and flowability of the phosphor powder can be adjusted.

<Applications of Phosphor>

The phosphor according to the present disclosure has high luminance. Therefore, highly efficient light-emitting devices can be configured by using the phosphor in the phosphor layer of the light-emitting devices. To do so, a conventional green phosphor such as $Y_3Al_5O_{12}$:Ce used in a phosphor layer of a light-emitting device is replaced with the phosphor according to the present disclosure, and the light-emitting device is configured in accordance with a known method. Examples of light-emitting devices include PDPs, fluorescent panels, fluorescent lamps (e.g., mercury-free fluorescent lamps), and LEDs. In particular, PDPs are suitable.

Hereinafter, as one embodiment of the PDP according to the present disclosure, a configuration of an exemplary alternating current surface discharge type PDP is described.

FIG. 1 is a perspective cross-sectional view showing a main structure of an alternating current surface discharge type PDP according to the present embodiment. Regarding the PDP 10 described as the present embodiment, a specific configuration, size, etc., of each portion are shown on the basis of a 42-inch display screen of 1,024×768 pixels for the sake of convenience. Needless to say, the PDP of the present embodiment may have sizes and specifications other than those with a 42 inch screen size.

As shown in FIG. 1, a PDP 10 according to the present embodiment includes a front panel 20 and a back panel 26, which are arranged so that the respective principal planes oppose each other.

The front panel 20 includes a front panel glass 21 as a front substrate, display electrodes (X electrodes 23, Y electrodes 22) in a band shape provided on one principal plane of the front panel glass 21, a front-side dielectric layer 24 with a thickness of 30 μm covering the display electrodes, and a protective layer 25 with a thickness of about 1.0 μm provided on the front-side dielectric layer 24.

The display electrode includes a band-shaped transparent electrode 220 (230) with a thickness of 0.1 μm and a width of 150 μm and a bus line 221 (231) with a thickness of 7 μm and a width of 95 μm provided so as to overlap the transparent electrode. Further, each pair of display electrodes (X electrode 23, Y electrode 22) is arranged in a plural number in a y-axis direction, with an x-axis direction being the longitudinal direction.

Further, each pair of display electrodes (X electrode 23, Y electrode 22) is electrically connected to a panel driving circuit (not shown) in the vicinity of ends in a right-left direction (y-axis direction) of the front panel glass 21. The Y electrodes 22 are connected to the panel driving circuit in a collective manner, and the X electrodes 23 are respectively independently connected to the panel driving circuit. When the Y electrode 22 and a given X electrode 23 are supplied with electricity through use of the panel driving circuit, surface discharge (sustain discharge) occurs in a gap (about 80 μm) between the X electrode 23 and the Y electrode 22. The X electrode 23 also can be operated as a scan electrode, whereby writing discharge (address discharge) is allowed to occur between the X electrode 23 and address electrodes 28 (described later).

The back panel 26 includes a back panel glass 27 as a back substrate, a plurality of address electrodes 28, a back side dielectric layer 29, partition walls 30, and phosphor layers 31 to 33 corresponding to any of red (R), green (G), and blue (B). The phosphor layers 31 to 33 are provided in contact with side walls of the two adjacent partition walls 30 and the back side dielectric layer 29 between the side walls so that the y-axis direction becomes a longitudinal direction. Further, a plurality of groups of the phosphor layers 31 to 33 is arranged repeatedly in the x-axis direction.

The green phosphor layer (G) contains the green phosphor according to the present disclosure, in other words, a phosphor represented by the general formula aBaO.(2-a)EuO.bMgO.cSiO$_2$.fCaCl$_2$ (where 1.800≤a≤1.980, 0.950≤b≤1.050, 1.900≤c≤2.100, and 0.001≤f≤0.020). Further, the red phosphor layer (R) and the blue phosphor layer (B) contain phosphors generally used in PDPs. For example, as a red phosphor, Y(P, V)O$_4$:Eu and Y$_2$O$_3$:Eu or (Y, Gd)BO$_3$:Eu can be used, and as a blue phosphor, BaMgAl$_{10}$O$_{17}$:Eu can be used.

Each phosphor layer can be formed by coating the partition walls 30 and the back side dielectric layer 29 with phosphor ink in which phosphor particles are dispersed, for example, by a known coating method such as a meniscus method or a line-jet method, followed by drying and firing (for example, 10 minutes at 500° C.). The phosphor ink can be prepared by mixing 30 mass % of a green phosphor having a volume average particle diameter of 2 μm, 4.5 mass % of ethyl cellulose having a weight average molecular weight of about 200,000, and 65.5 mass % of butylcarbitol acetate. Further, it is preferred that the final viscosity of the phosphor ink be set to about 2,000 to 6,000 cps (2 to 6 Pas) because the adhesive strength of the ink with respect to the partition walls 30 can be enhanced.

The address electrodes 28 are provided on one principal plane of the back panel glass 27. Further, the back side dielectric layer 29 is provided so as to cover the address electrodes 28. Further, the partition walls 30 have a height of about 150 μm and a width of about 40 μm, as an example, and the partition walls 30 are arranged on the back side dielectric layer 29 in accordance with a pitch between the adjacent address electrodes 28, with the y-axis direction being the longitudinal direction.

The address electrodes 28 respectively have a thickness of 5 μm and a width of 60 μm, and the address electrodes 28 are arranged in a plural number in the x-axis direction, with the y-axis direction being a longitudinal direction. Further, the address electrodes 28 are arranged so that a pitch thereof becomes a predetermined interval (about 150 μm). The plurality of address electrodes 28 is connected to the panel driving circuit respectively and independently. By supplying electricity to each address electrode, address discharge is allowed to occur between a given address electrode 28 and a given X electrode 23.

The front panel 20 and the back panel 26 are disposed in such a manner that the address electrodes 28 and the display electrodes are orthogonal to each other. The front panel 20 and the back panel 26 are sealed airtightly with a frit glass sealing portion (not shown) as a sealing member placed so as to surround a circumferential portion.

In an airtight space between the front panel 20 and the back panel 26 sealed with the frit glass sealing portion, a discharge gas formed of rare gas components such as He, Xe, and Ne is sealed under a predetermined pressure (generally, about 6.7×10$^4$ to 1.0×10$^5$ Pa).

A space corresponding to a region between the two adjacent partition walls 30 serves as a discharge space 34. Further, a region where a pair of display electrodes and one address electrode 28 cross each other with the discharge space 34 interposed therebetween corresponds to a cell for displaying an image. In the PDP 10 according to the present embodiment, a cell pitch in the x-axis direction is set to about 300 μm, and a cell pitch in the y-axis direction is set to about 675 μm.

Further, when the PDP 10 is driven, a pulse voltage is applied across the given address electrode 28 and the given X electrode 23 with the pulse driving circuit to generate address discharge, and thereafter, a pulse is applied across the pair of display electrodes (X electrode 23, Y electrode 22) to generate sustain discharge. A predetermined image can be displayed on the front panel 20 side by causing phosphors contained in the phosphor layers 31 to 33 to emit visible light through use of ultraviolet rays (as an example, a resonance line whose center wavelength is about 147 nm and a molecular beam whose center wavelength is 172 nm) having a short wavelength generated by the sustain discharge.

EXAMPLES

Hereinafter, the phosphor according to the present disclosure will be described in detail by way of specific Examples and Comparative Examples. It should be noted that the phosphor according to the present disclosure is not limited to these Examples.

<Production of Phosphor Samples>

$BaCO_3$, $Eu_2O_3$, MgO, $SiO_2$, and $CaCl_2$ were used as starting materials. The materials were weighed so as to obtain predetermined compositions and subjected to wet mixing in pure water through use of a ball mill. The mixtures thus obtained were dried, and then sintered first in air at a temperature in the range of 800° C. to 1,000° C. for four hours, and then in nitrogen gas containing 1 to 5 vol % of hydrogen at a temperature in the range of 1000° C. to 1,200° C. for four hours to obtain phosphor powders.

Further, the phosphor powders thus obtained were each crushed again through use of the ball mill to adjust the particle size distribution.

<Measurement of Luminance>

The phosphor samples corresponding to Examples and Comparative Examples were irradiated with vacuum ultraviolet rays having a wavelength of 146 nm in vacuum to measure light in a visible area emitted by each phosphor sample.

Table 1 shows the composition ratio and the luminance (Y) of each of the phosphors produced. Y represents luminance Y in an XYZ color specification system of Commission Internationale de l'Eclairage, which is a relative value to the luminance of a $Y_3Al_5O_{12}$:Ce phosphor (commercial product) listed as Sample No. 1. In Table 1, the phosphor samples with the symbol "*" correspond to Comparative Examples, whose composition was out of the range of the composition of the phosphor disclosed in the present application.

TABLE 1

| Sample No. | a | b | c | f | Y (%) |
|---|---|---|---|---|---|
| *1 | $(Y, Ce)_3Al_5O_{12}$ | | | | 100 |
| *2 | 1.700 | 1.000 | 2.000 | 0 | 85 |
| *3 | 1.800 | 1.000 | 2.000 | 0 | 92 |
| 4 | 1.800 | 1.000 | 2.000 | 0.001 | 105 |
| 5 | 1.860 | 1.000 | 2.000 | 0.020 | 108 |
| *6 | 1.860 | 1.000 | 2.000 | 0.040 | 98 |
| *7 | 1.990 | 1.000 | 2.000 | 0 | 85 |
| 8 | 1.980 | 1.000 | 2.000 | 0.005 | 110 |
| 9 | 1.960 | 1.000 | 2.000 | 0.005 | 116 |
| 10 | 1.920 | 1.000 | 2.000 | 0.010 | 118 |
| 11 | 1.880 | 1.000 | 2.000 | 0.005 | 120 |
| 12 | 1.960 | 0.950 | 2.000 | 0.005 | 114 |
| 13 | 1.960 | 1.050 | 2.000 | 0.005 | 118 |
| 14 | 1.960 | 1.000 | 1.900 | 0.005 | 117 |
| 15 | 1.960 | 1.000 | 2.100 | 0.005 | 114 |
| *16 | 1.960 | 0.800 | 2.000 | 0.005 | 96 |
| *17 | 1.960 | 1.200 | 2.100 | 0.005 | 82 |
| *18 | 1.960 | 1.000 | 1.700 | 0.005 | 76 |
| *19 | 1.960 | 1.000 | 2.300 | 0.005 | 90 |

As can be seen from Table 1, the phosphors whose composition ratio was within the composition range of the phosphor according to the present disclosure, i.e., the phosphors satisfying the conditions ($1.800 \leq a \leq 1.980$, $0.950 \leq b \leq 1.050$, $1.900 \leq c \leq 2.100$, and $0.001 \leq f \leq 0.020$) showed high luminance when excited by vacuum ultraviolet rays. In particular, the phosphor sample Nos. 9 to 15 in Table 1 whose composition ratio was within the composition range of $1.88 \leq a \leq 1.960$ showed particularly high luminance.

The phosphor samples Nos. 4, 5, and 8 to 15 shown as Examples were pulse-irradiated with vacuum ultraviolet rays having a wavelength of 146 nm in vacuum, and time during which emission intensity in a visible area is attenuated to 1/10 (1/10 decay time) was measured. As a result, it was shown that all of them had excellent decay characteristics (0.3 milliseconds or less).

<Luminance of PDP Panel Using Phosphor According to Present Disclosure>

Alternating current surface discharge type PDPs having a configuration as shown in FIG. 1 were produced. In the PDPs, the green phosphors listed in Table 1 as Sample Nos. 1, and 6 to 11 were used as a phosphor forming a green phosphor layer. The initial luminance of each PDP produced was measured. Table 2 provides the results of measuring the initial luminance of the PDPs that used the phosphors having different compositions. With regard to the PDPs using the phosphor sample Nos. 6 to 11, the initial luminance is expressed as a relative value to the initial luminance of the PDP using the phosphor sample No. 1.

At the time of measurement, the color displayed by the PDPs was fixed only to green. Also in Table 2, the green phosphor sample Nos. with the symbol "*" are phosphors corresponding to Comparative Examples whose composition was out of the range of the composition of the phosphor according to the present disclosure.

TABLE 2

| Sample No. | Sample No. of phosphor used | Panel Characteristics Luminance (%) |
|---|---|---|
| *20 | Sample No. 1 | 100 |
| *21 | Sample No. 6 | 86 |
| *22 | Sample No. 7 | 82 |
| 23 | Sample No. 8 | 115 |
| 24 | Sample No. 9 | 120 |
| 25 | Sample No. 10 | 115 |
| 26 | Sample No. 11 | 112 |

As can be seen from Table 2, it was shown that the panel luminance of the PDPs improved by using the phosphor according to the present disclosure as a green phosphor.

INDUSTRIAL APPLICABILITY

A plasma display panel (PDP) with short persistence, high luminance and high efficiency can be provided by using the phosphor according to the present disclosure. In addition to a PDP, the phosphor according to the present disclosure can also be applied to a fluorescent panel and a fluorescent lamp such as an electrode-free fluorescent lamp.

The invention claimed is:

1. A plasma display panel comprising a green phosphor layer that emits visible light when excited with vacuum ultraviolet rays,
   wherein the green phosphor layer contains a green phosphor represented by the general formula $aBaO.(2-a)EuO.bMgO.cSiO_2.fCaCl_2$ (where $1.800 \leq a \leq 1.980$, $0.950 \leq b \leq 1.050$, $1.900 \leq c \leq 2.100$, and $0.001 \leq f \leq 0.020$).

2. The plasma display panel according to claim 1, wherein a is in the range of $1.880 \leq a \leq 1.960$.

3. A phosphor represented by the general formula $aBaO.(2-a)EuO.bMgO.cSiO_2.fCaCl_2$ (where $1.800 \leq a \leq 1.980$, $0.950 \leq b \leq 1.050$, $1.900 \leq c \leq 2.100$, and $0.001 \leq f \leq 0.020$).

* * * * *